(12) United States Patent
Hammam et al.

(10) Patent No.: US 8,812,894 B2
(45) Date of Patent: Aug. 19, 2014

(54) SYSTEMS AND METHODS FOR RECOVERING FROM THE FAILURE OF A GATEWAY SERVER

(75) Inventors: Tarik Hammam, Kista (SE); Anders Franzen, Trangsund (SE); Mattias Holmqvist, Nacka (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 405 days.

(21) Appl. No.: 13/144,602

(22) PCT Filed: Jan. 16, 2009

(86) PCT No.: PCT/IB2009/000073
§ 371 (c)(1),
(2), (4) Date: Jul. 14, 2011

(87) PCT Pub. No.: WO2010/082076
PCT Pub. Date: Jul. 22, 2010

(65) Prior Publication Data
US 2012/0023361 A1     Jan. 26, 2012

(51) Int. Cl.
*G06F 11/00* (2006.01)
(52) U.S. Cl.
USPC .......................................... 714/4.11; 714/4.12
(58) Field of Classification Search
USPC ........................................ 714/4.1, 4.11, 4.12
See application file for complete search history.

(56) References Cited

U.S. PATENT DOCUMENTS

| 6,195,705 B1 | 2/2001 | Leung | |
| 6,708,219 B1 * | 3/2004 | Borella et al. | 709/245 |
| 6,928,576 B2 * | 8/2005 | Sekiguchi | 714/4.3 |
| 7,139,926 B1 * | 11/2006 | Madhav et al. | 714/4.11 |
| 7,152,179 B1 * | 12/2006 | Critchfield | 714/4.11 |
| 7,209,968 B1 * | 4/2007 | Secer | 709/226 |
| 7,227,872 B1 * | 6/2007 | Biswas et al. | 370/465 |
| 8,000,231 B2 * | 8/2011 | Li et al. | 370/219 |
| 8,065,559 B2 * | 11/2011 | Kamath et al. | 714/10 |
| 2002/0166080 A1 * | 11/2002 | Attanasio et al. | 714/15 |
| 2012/0106505 A1 * | 5/2012 | Rameshwaran et al. | 370/331 |

FOREIGN PATENT DOCUMENTS

| JP | 2002-354002 A | 12/2002 |
| JP | 2003-060711 A | 2/2003 |

OTHER PUBLICATIONS

Borella, et al., "Realm Specific IP: Framework", Network Working Group, Request for Comments: 3102; Category: Experimental, Oct. 2001, 31 pages, XP015008883.
Srisuresh, et al., "IP Network Address Translator (NAT) Terminology and Considerations", Network Working Group, Request for Comments: 2663; Category: Informational, Aug. 1999, 30 pages, XP002204216.
Tang, et al, "Mobile IP Use of Private Addresses in an RSIP Home Network", Wireless Communications and Networking Conference, Apr. 3-6, 2006, pp. 562-567, XP031331359.

* cited by examiner

*Primary Examiner* — Philip Guyton
(74) *Attorney, Agent, or Firm* — Rothwell, Figg, Ernst & Manbeck, P.C.

(57) ABSTRACT

Disclosed is a method for recovering from the failure of a gateway server. In some embodiment, the method includes: receiving, at a backup gateway server, a message transmitted from a client, the message comprising a network resource previously allocated to the client by the gateway server that failed; determining whether the network resource is free; and transmitting, from the backup gateway server to the client, an acknowledgment indicating that the client may continue using the network resource in response to a determination that the network resource is free.

37 Claims, 6 Drawing Sheets

SYSTEMS AND METHODS FOR RECOVERING FROM THE FAILURE OF A GATEWAY SERVER

CROSS REFERENCE TO RELATED APPLICATION(S)

This application is a 35 U.S.C. §371 National Phase Entry Application from PCT/IB2009/000073, filed Jan. 16, 2009, the disclosure of which is incorporated herein in its entirety by reference.

TECHNICAL FIELD

The present invention relates to gateway servers that provide network resources from one addressing realm to clients from another addressing realm. More specifically, the invention relates to systems and methods for recovering from the failure of a gateway server.

BACKGROUND

Network Address Translation (NAT) has become a popular mechanism of enabling the separation of addressing realms. A NAT router must examine and change the network layer, and possibly the transport layer, header of each packet crossing the addressing realms that the NAT router is connecting. This causes the mechanism of NAT to violate the end-to-end nature of Internet connectivity, and disrupts protocols requiring or enforcing end-to-end integrity of packets.

An alternative to NAT is Realm Specific IP (RSIP) (see Request For Comment (RFC) 3102). RSIP is based on the concept of granting a client from one addressing realm a presence in another addressing realm by allowing the client to use resources (e.g., addresses, ports and/or other routing parameters) from the second addressing realm. An RSIP server replaces the NAT router, and RSIP-aware client on the private network are referred to as RSIP clients. RSIP requires ability of the RSIP server to grant such resources to RSIP clients.

RSIP allows a degree of address realm transparency to be achieved between two differently-scoped, or completely different addressing realms. This makes it a useful architecture for enabling end-to-end packet transparency between addressing realms. RSIP is expected to be deployed on privately addressed IPv4 networks and used to grant access to publicly addressed IPv4 networks. However, in place of the private IPv4 network, there may be an IPv6 network, or a non-IP network. Thus, RSIP allows IP connectivity to client on a host with an IP stack and IP applications but no native IP access. As such, RSIP can be used, in conjunction with DNS and tunneling, to bridge IPv4 and IPv6 networks, such that dual-stack hosts can communicate with local or remote IPv4 or IPv6 hosts.

Referring now to FIG. 1, in a typical scenario in which RSIP may be deployed, there is at least one client host 102 connected to a network 110a having one addressing realm (realm A), another client host 120 connected to a network 110b having a different addressing realm (realm B), and a gateway 104 that is connected to both networks 110a and 110b. As illustrated, hosts 102 and 120 belong to different addressing realms A and B, respectively. Gateway 104 has two interfaces: (1) Na on address realm A, and (2) Nb on address realm B. Executing on gateway 104 is an RSIP server 105 that has a pool of addresses in address realm B that it can assign to or lend to a client 103 on client host 102 and other clients on other hosts in address realm A. These addresses can be denoted as Nb1, Nb2, Nb3 and so on.

As is often the case, hosts within address realm A are likely to use private addresses while gateway 104 is multi-homed with one or more private addresses from address realm A in addition to its public addresses from address realm B. Thus, we typically refer to the realm in which client host 102 resides as "private" and the realm from which client host 102 borrows addressing parameters as the "public" realm. However, these realms may both be public or private. Moreover, address realm A may be an IPv6 realm or a non-IP address realm.

Client 103, wishing to establish an end-to-end connection to a client on client host 120 situated within address realm B, first negotiates and obtains assignment of public resources (e.g., addresses and other routing parameters of address realm B) from server 105. Upon assignment of these public resources, server 105 creates a mapping, referred to as a "bind", of client 103's private addressing information and the assigned resources. Such a bind enables gateway 104 to correctly forward inbound traffic generated by client host 120 for client 103.

Using the public resources assigned by server 105, client 103 tunnels data packets across network 110a to server 105. Server 105 acts as the end point of such tunnels, stripping off the outer headers and routing the inner packets onto the public realm (i.e., network 110b in the example shown in FIG. 1). As mentioned above, server 105 maps the public parameters assigned to client 103 to the private address used by client 103. When a packet from the public realm arrives at gateway 104 and it matches a bind, then server 105 will tunnel it to the appropriate host.

The RSIP RFC defines two basic flavors of RSIP: (1) RSA-IP and (2) RSAP-IP. When using RSA-IP, an RSIP server maintains a pool of available network addresses (e.g., IP addresses) to be leased by RSIP clients. Upon request, the RSIP server allocates an address to the client. Once an address is allocated to a particular client, only that client may use the address until the address is returned to the pool. Clients should not use addresses that have not been specifically assigned to them. The client may use any layer four address (e.g., TCP/UDP port) in combination with their assigned layer three (i.e., network) address.

When using RSAP-IP, an RSIP gateway maintains a pool of layer three and layer four addresses (e.g., IP addresses as well as pools of port numbers per address). RSIP hosts lease an IP address and one or more ports to use with it. Once an address/port tuple has been allocated to a particular client, only that client should use the tuple until it is returned to a pool. Clients should not use address/port combinations that have not been specifically assigned to them.

It is possible that server 105 may fail. What is desired, therefore, are systems and methods for detecting a server failure and gracefully recovering from the failure.

SUMMARY

In one aspect, the present invention provides a method performed by a first client executing on a first host in a first addressing realm for communicating with a remote client executing on a remote host in a second addressing realm. In some embodiments, the method includes: transmitting to a first gateway server a request for a network resource (e.g., a set of one or more network addresses, such as IP addresses, and port numbers) from the second addressing realm; receiving from the first gateway server a message comprising a network resource from the second addressing realm; using the received network resource to communicate with the remote client; receiving an indication that the first gateway server is not functioning; and in response to receiving the indication, transmitting to a second gateway server the network resource received from the first gateway server. The second gateway server may execute on the first host In some embodiments, the first client transmits the network resource to the second gateway server in response to receiving the indication only if the network resource is still allocated to the first client at the time the first client receives the indication.

In some embodiments, in response to receiving the indication, the first client transmits to the second gateway server all currently held network resources that were allocated to the first client by the first gateway server.

In some embodiments, the second gateway server is configured to set a delayed allocation (DA) timer to expire after a predetermined amount of time after receiving from the first client the network resource.

In some embodiments, the method also includes receiving from the second gateway server a message indicating that the first client should not continue using the network resource after transmitting the network resource to the second gateway server; and after receiving the message, restarting the first client or rebooting the first host.

In some embodiments, the network resource comprises a network address and the step of using the network resource to communicate with the remote client comprises: generating a packet comprising (i) a first header, (ii) a second header and (iii) a payload, wherein the first header includes a source address field that is set to the network address from the second addressing realm, the second header includes a source address field that is set to an address that was allocated to the first host; and transmitting the packet to the first gateway server, wherein the first gateway server is configured to send the packet without the second header to the remote client.

In another aspect, the present invention provides a method for recovering from the failure of a gateway server belonging to a first addressing realm and a second addressing realm. In some embodiments, the method includes the following steps: (a) detecting the failure of the gateway server; (b) in response to detecting the failure of the gateway server, determining a set of clients that should receive a notification indicating the failure of the gateway server; (c) transmitting, to each client in the determined set of clients, a message indicating that the gateway server has failed; (d) receiving, at a backup gateway server belonging to the first addressing realm and the second addressing realm, a message transmitted from one of the clients, the message comprising a network resource from the second addressing realm previously allocated to the client by the gateway server that failed; (e) after step (d), determining whether the network resource is free, wherein the determination is made by the backup gateway server; (f) allocating the network resource to the client in response to determining that the network resource is free; and (g) setting a delayed allocation (DA) timer to expire after a predetermined amount of time after performing step (d) (in some embodiments, the DA timer is set only if it is determined in step (b) that the network resource is free).

The method may also include: receiving, at the backup gateway server, a request transmitted from a second client for a second network resource from the second addressing realm; rejecting the request if the DA timer has not expired; and transmitting, from the backup gateway server, to the second client a second network resource from the second addressing realm if the DA timer has expired and the second network resource is available to be allocated to the second client. The step of rejecting the request may consists of ignoring the request (e.g., not transmitting to the second client any response to the request) or transmitting to the second client a response to the request indicating that the request is denied.

In some embodiments, the method also includes causing the client to relinquish the network resource from the second addressing realm in response to a determination in step (e) that the network resource is not free. More specifically, in some embodiments, the method also includes causing the client to relinquish the network resource from the second addressing realm in response to a determination in step (e) that (i) the network resource is currently allocated to another client and (ii) the another client is not executing on the same host as the backup gateway server. The step of causing the client to relinquish the network resource may consist of restarting the client or rebooting the host on which the client is executing.

In some embodiments, the network resource comprises a set of one or more network addresses, and the step of determining whether the network resource is free comprises determining whether any of the network addresses included in the set of network addresses is currently allocated to another client. The method may further include determining whether the another client is executing on the same host as the backup gateway server in response to determining that a network address included in the set of network addresses is currently allocated to the another client; and causing the another client to relinquish the network address if it is determined that the another client is executing on the same host as the backup gateway server.

In some embodiments, the step of determining the set of clients that should receive the notification comprises determining all of the clients that are connected to a gateway server monitor.

In another aspect, the invention provides an improved client host apparatus that belongs to a first addressing realm. In some embodiments, the client host apparatus includes: a transmitter; a data storage system that stores computer software; and a data processing system for executing the computer software. In some embodiments, the computer software comprises: computer instructions for using the transmitter to transmit to a first gateway server a request for a network resource from a second addressing realm; computer instructions for receiving from the first gateway server a message comprising a network resource from the second addressing realm; computer instructions for using the received network resource to communicate with a remote client; and computer instructions for using the transmitter to transmit to a second gateway server the network resource received from the first gateway server in response to receiving an indication that the first gateway server is not functioning.

In some embodiments, the computer software further comprises: computer instructions for receiving from the second gateway server a message indicating that a client executing on the client host apparatus should not continue using the network resource; and computer instructions for restarting the first client or rebooting the first host in response to receiving the message.

The network resource may comprise a network address and the computer instructions for using the network resource to communicate with the remote client may comprise: computer instructions for generating a packet comprising (i) a first header, (ii) a second header and (iii) a payload, wherein the first header includes a source address field that is set to the network address from the second addressing realm, the second header includes a source address field that is set to an address that was allocated to the first host; and computer instructions for transmitting the packet to the first gateway server.

In another aspect, the present invention provides an improved gateway server apparatus belonging to a first addressing realm and a second addressing realm. In some embodiments, the improved gateway server apparatus includes: a transmitter; a receiver; data storage system that stores computer software; and a data processing system for executing the computer software, wherein the computer software comprises: (a) computer instructions for receiving a message transmitted from a client belonging to the first addressing realm, the message comprising a network resource from the second addressing realm previously allocated to the client by a gateway server that has failed; (b) computer instructions for determining whether the network resource is free in response to receiving the message; (c) computer instructions for allocating the network resource to the client in response to determining that the network resource is free; (d) computer instructions for setting a delayed allocation (DA) timer to expire after a predetermined amount after receiving the message; (e) computer instructions for receiving a request transmitted from a second client for a second network resource from the second addressing realm; (f) computer instructions for determining whether the DA timer has expired in response to receiving the request; and (g) computer instructions for transmitting to the second client a second network resource from the second addressing realm in response to a determination that the DA timer has expired and the second network resource is available to be allocated to the second client.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
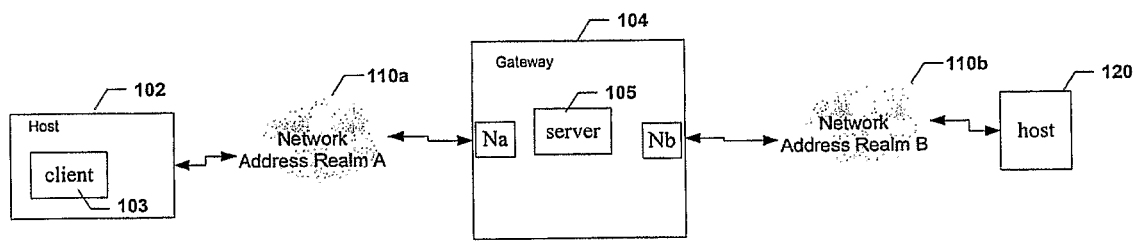
FIG. 1 illustrates a communication system.
Figure 2:
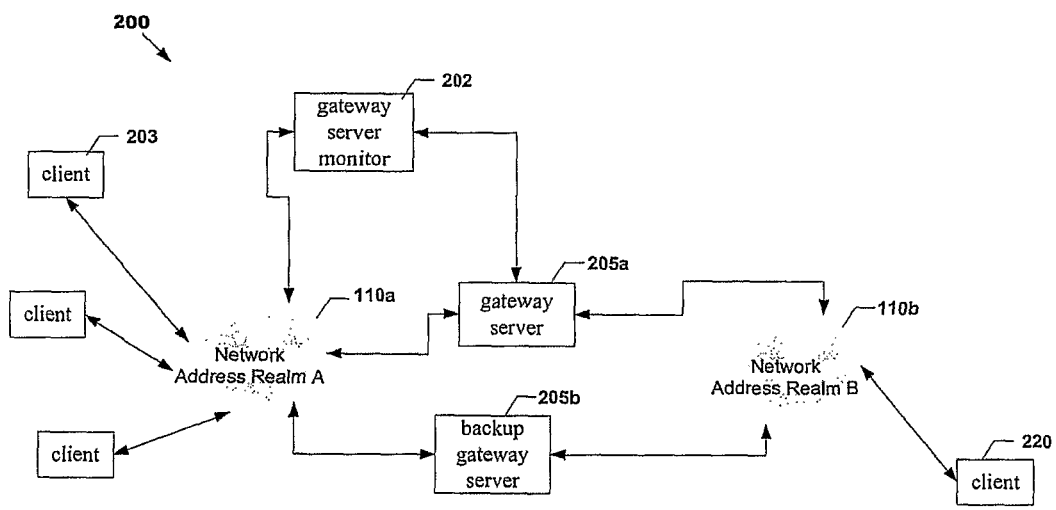
FIG. 2 illustrates a communication system according to an embodiment of the invention.

Referring now to FIG. 2, FIG. 2 is a functional block diagram illustrating a system 200 according to an embodiment of the invention. As shown in FIG. 2, system 200 includes a primary gateway server 205a and a backup gateway server 205b. As illustrated in FIG. 2, gateway servers 205a and 205b belong to both addressing realm A and addressing realm B. The gateway servers 205 are configured to allocate network resources from the addressing realm B to clients 203 (which may be RSIP clients), which belong to addressing realm A. Accordingly, gateway servers 205a,b may be RSIP servers or may be similar to RSIP servers. A network resource may consist of a single network address or plurality of network address. In some embodiments, a network resource consists of a set of one or more network addresses (e.g., Internet Protocol address) and a set of one or more port numbers.

As further shown in FIG. 2, system 200 includes a gateway server monitor 202 that is configured to detect a failure of gateway server 205a and cause the clients 203 that were utilizing gateway server 205a to communicate with remote clients in addressing realm B (e.g., remote client 220) to failover to backup gateway server 205b. In a preferred embodiment, gateway server 205b is a cold standby to primary gateway server 205a.

While gateway server monitor 202 is shown in FIG. 2 as being a centralized monitor, it is contemplated that gateway server monitor 202 may be a distributed monitor. For example, gateway server monitor 202 may be a component of a client 203. That is, each client 203 may include gateway server monitor code for detecting a failure in gateway server 205a. Alternatively, gateway server monitor 202 may be a separate process that executes on each host on which a client 203 executes.

Figure 3:
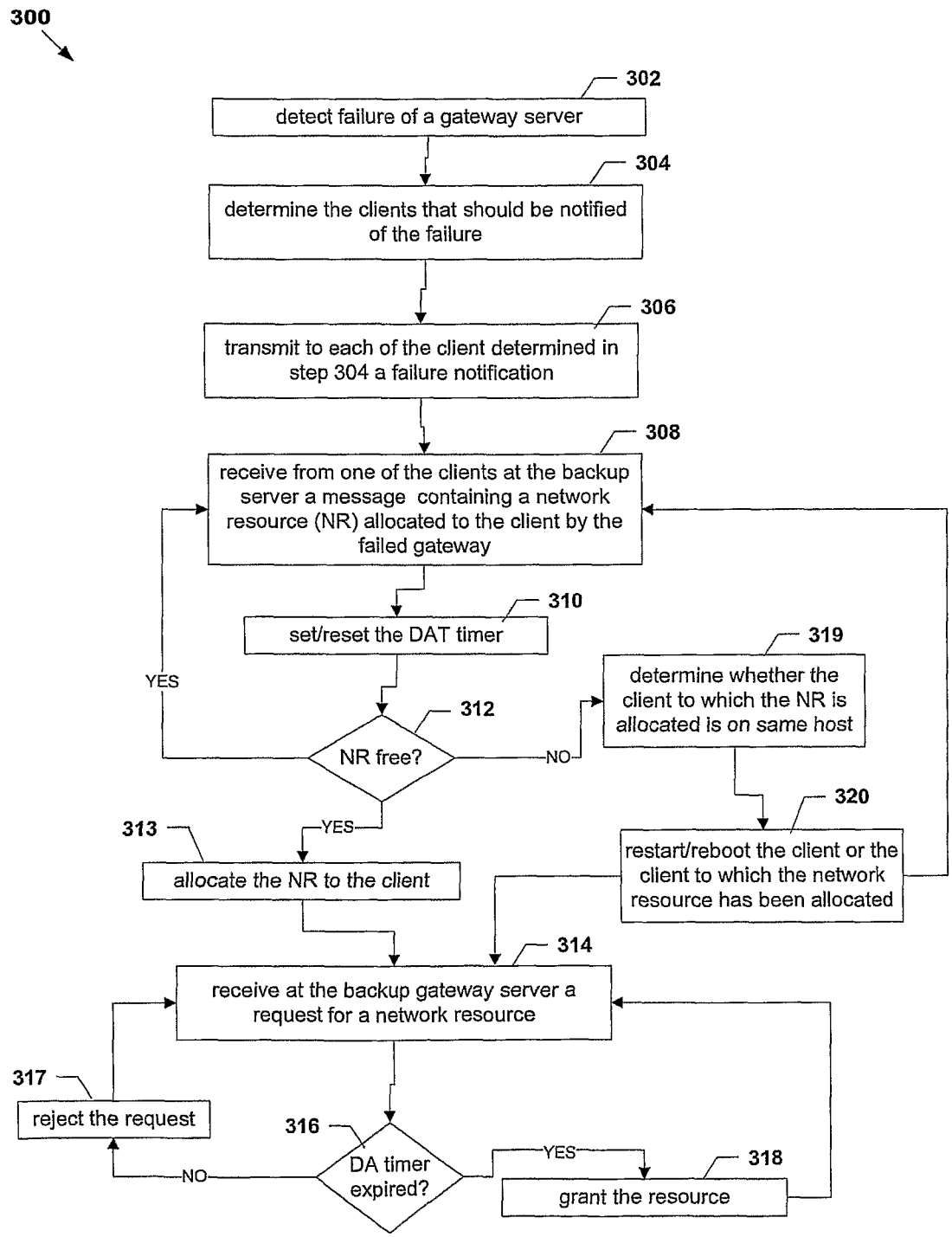
FIG. 3 is a flow chart illustrating a process according to an embodiment of the invention.

Referring now to FIG. 3, FIG. 3 is a flow chart illustrating a process 300 according to some embodiments of the invention.

Process 300 may begin in step 302 where monitor 202 detects the failure of gateway server 205a.

In step 304, monitor 202 determines a set of clients that should receive a notification indicating the failure of gateway server 205a. In some embodiments, each client 203 that is holding a resource allocated to the client 203 by gateways server 205a maintains a connection with monitor 202. Accordingly, in some embodiments, monitor 202 determines the set of clients that should receive the notification by determining all of the clients 203 that are connected to gateway server monitor 202.

In step 306, monitor 202 transmits to each client in the determined set of clients a notification indicating the failure of gateway server 205a. The notification may contain information identifying backup gateway server 205b (e.g., the network address of server 205b). Steps 304-306 may not be necessary in the embodiments where monitor 202 is a distributed monitor.

In a preferred embodiment, each client 203 that receives the notification is configured to contact backup gateway server 205b and provide to backup gateway server 205b all of the network resources from addressing realm B that are being held by the client and that were allocated to the client by gateway server 205a.

Accordingly, in step 308, backup gateway server 205b receives from a client 203 a message containing at least one network resource from realm B allocated to the client 203 by gateway server 205a.

In step 310, backup gateway server 205b configures a delayed allocation (DA) timer to expire in a certain amount of time (e.g., 1 minute).

In step 312, backup gateway server 205b determines whether a network resource received in step 308 is free. That is, backup gateway server 205b determines whether the network resource has been allocated to another client and the other client is still holding the network resource. To keep track of which network resources are free and which are not, backup gateway server may maintain a database (e.g., a table or other data structure) that, for each allocated network resource, maps the allocated network resource to a client.

Thus, if a network resource is not mapped to a client, the network resource is deemed to be free. As discussed above, in some embodiments, a network resource may includes a plurality of network addresses. In these embodiments, the step of determining whether the network resource is free includes determining whether each of the plurality of network addresses is free. If one network address is not free, then, in some embodiments, the network resource is deemed to be not free.

If the network resource is determined in step 312 to be free, process 300 proceeds to step 313 and may also proceed back to step 308, otherwise process 300 proceeds to step 319.

In step 313, backup gateway server 205b allocates the network resource to the client. As discussed above, the step of allocating the network resource to the client may include updating a database so that the network resource is mapped to the client.

In step 314, backup gateway server 205b receives from a client 203 a request for a network resource from addressing realm B. In response, backup gateway server 205b determines whether the DA timer has expired (step 316). If it has expired, backup gateway server 205b rejects the request (step 317). In some embodiments, the step of rejecting a request consists of simply ignoring the request (i.e., not transmitting to the requesting client any response to the request). In other embodiments, the step of rejecting the request includes transmitting to the requesting client a response indicating that the request is denied.

If in step 316 it is determined that the DA timer has not expired, then, assuming a requested network resource is free, backup gateway server 205b allocates to the requesting client a network resource from addressing realm B (step 318).

As mentioned above, step 319 is reached if backup gateway server 205b determines that the network resource received by the client in step 308 is not free (i.e., the resource is allocated to another client). In step 319, backup gateway server 205b determines (i) the other client to which the network resource is allocated (e.g., by accessing the database described above) and (ii) whether that other client is executing on the host on which the backup gateway server 205b is executing. If the other client is executing on the host on which the backup gateway server 205b is executing, then backup gateway server 205b causes the other client to relinquish the network resource, otherwise backup gateway server 205b causes the client who transmitted to network resource in step 308 to relinquish the network resource (step 320). In some embodiments, backup gateway server 205b causes a client to relinquish a network resource by restarting the client or rebooting the host on which the client is executing. In some embodiments, backup gateway server 205b restarts the client or reboots the host on which the client runs by transmitting a negative acknowledgment (NACK) to the client (i.e., some message indicating that the backup gateway server 205b has determined that the network resource is not free).

Referring back to step 310, in which backup gateway server 205b activates the DA timer, in some embodiments, backup gateway server 205b activates the DA timer only if the network resource is determined to be free in step 312. Thus, in some embodiments, step 310 occurs after step 312 and only if in step 312 it is determined that the network resource is free.

Figure 4:
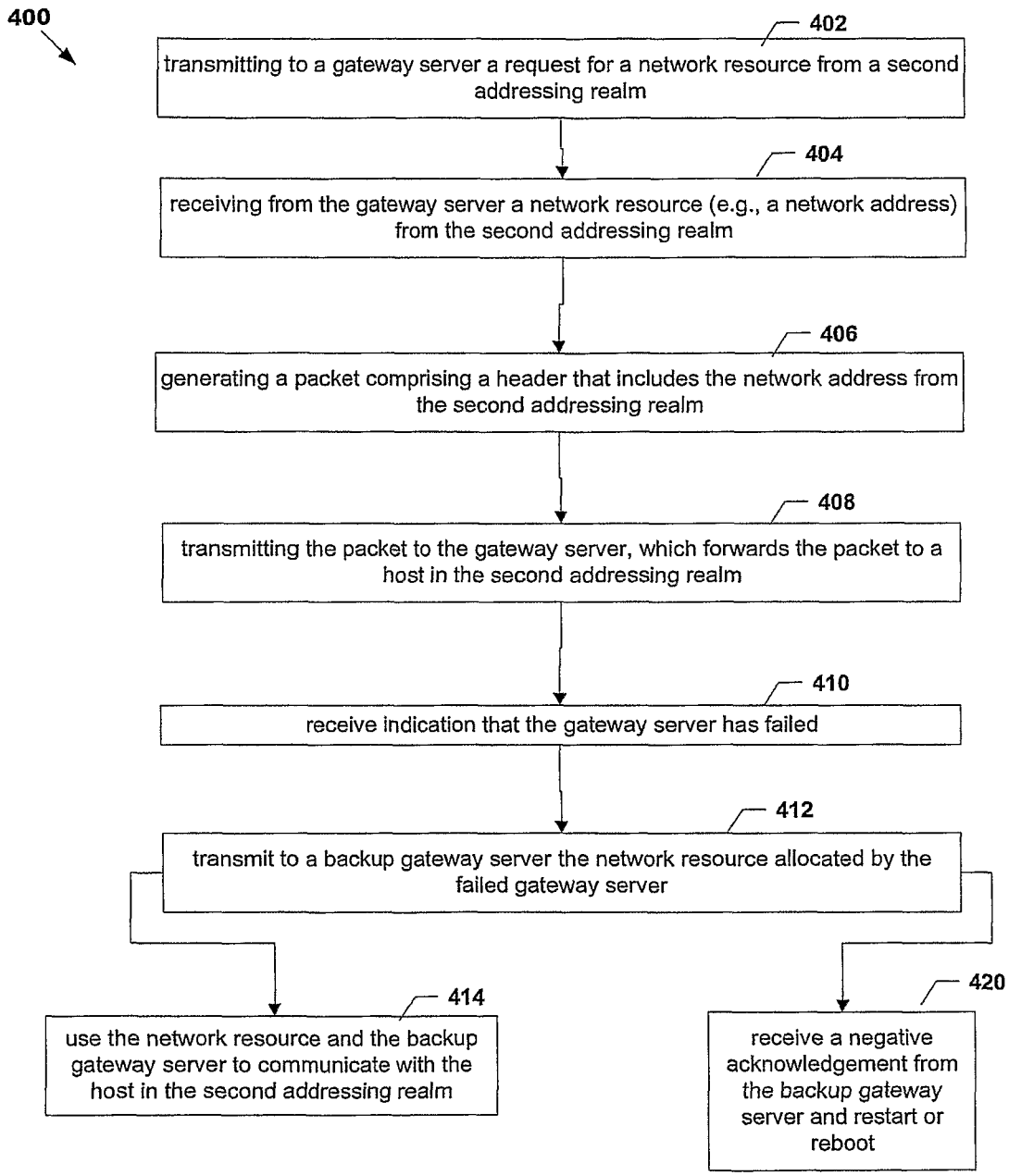
FIG. 4 is a flow chart illustrating a process according to an embodiment of the invention.

Referring now to FIG. 4, FIG. 4 is a flow chart illustrating a process 400, according to some embodiments of the invention, that is performed by a client 203.

Process 400 may begin in step 402, where client 203 transmits to gateway server 205a a request for a network resource from addressing realm B.

In step 404, client 203 receives from gateway server 205a a network resource (e.g., a set of one or more network addresses) from addressing realm B.

Client 203 then uses the network resource to communicate with a remote client 200 connected to network 110b. For example, client 203 generates a packet comprising a header that includes one of the network addresses from realm B included in the network resource (step 406) and transmits the packet to gateway server 205a (step 408). In some embodiments, the packet also includes a second header that includes an address (e.g., a network address or other address) allocated to the host on which client 203 executes, and gateway server 205a is configured to remove the second header from the packet and transmit the packet sans the second header to remote client 220.

In step 410, client 203 receives an indication that gateway server 205a has failed (e.g., is no longer able to provide gateway services). As discussed above, client 203 may receive the indication by receiving a notification from a centralized gateway server monitor 202. In other embodiments, as discussed above, client 203 itself may include a gateway server monitor 202 module that can detect when gateway server 205a has failed.

In step 412, client 203 transmits to a backup gateway server 205b the network resource it received in step 404 if client 203 has not relinquished that network resource. In a preferred embodiment, in step 412, client 203 transmit to backup gateway server 205b all network resources that it has not yet relinquished and that were allocated by the failed gateway server to client 203.

In step 414, if client 203 does not receive a NACK from backup gateway server 205b, client 203 continues using the network resource to communicate with remote client 220. More specifically, client 203 uses the network resource and backup gateway server 205b to communicate with remote client 220. In step 420, if client 203 receives from backup gateway server 205b a NACK, client 203 is restarted or the host on which client 203 executes is rebooted.

Figure 5:
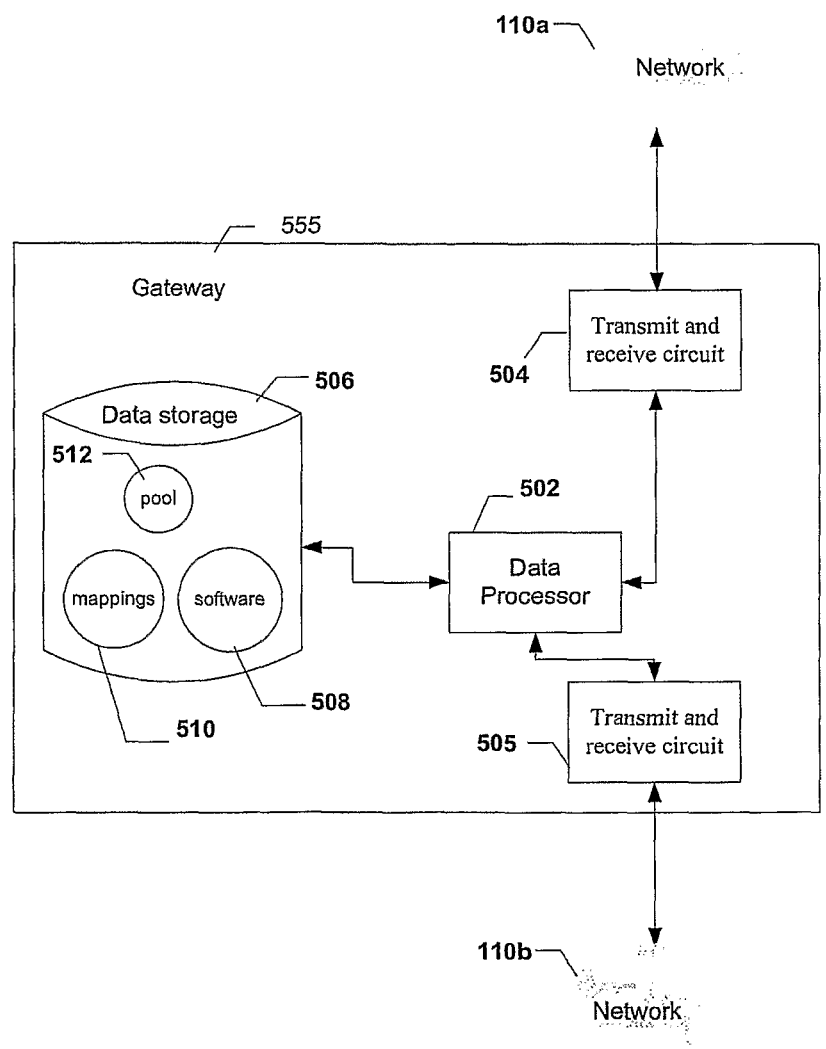
FIG. 5. is a functional block diagram of a network gateway according to some embodiments of the invention.

Referring now to FIG. 5, FIG. 5 is a functional block diagram of a gateway 555 according to some embodiments of the invention. As shown, gateway 555 may comprise a data processing system 502 (e.g., one or more microprocessors), a data storage system 506 (e.g., one or more non-volatile storage devices) and computer software 508 stored on the storage system 506. Configuration parameters 510 may also be stored in storage system 506. gateway 555 also includes transmit/receive (Tx/Rx) circuitry 504 for transmitting data to and receiving data from network 110a and transmit/receive (Tx/Rx) circuitry 505 for transmitting data to and receiving data from network 110b. Software 508 is configured such that when processor 502 executes software 508, gateway 555 performs steps described above (e.g. steps described above with reference to the flow chart shown in FIG. 3).

For example, software 508 may include: (1) computer instructions for receiving from a client 203 belonging to addressing realm A a message comprising a network resource from the addressing realm B previously allocated to the client by a gateway server that has failed; (2) computer instructions for determining whether the network resource is free in response to receiving the message; and (3) computer instructions for allocating the network resource to the client in response to determining that the network resource is free.

The software 508 may also include: (4) computer instructions for setting a delayed allocation (DA) timer to expire after a predetermined amount after receiving the message; (5) computer instructions for receiving a request transmitted from a second client for a second network resource from the addressing realm B; (6) computer instructions for determining whether the DA timer has expired in response to receiving the request; and (7) computer instructions for transmitting to the second client a second network resource from the addressing realm B in response to a determination that the DA timer has expired and the second network resource is available to be allocated to the second client.

Figure 6:
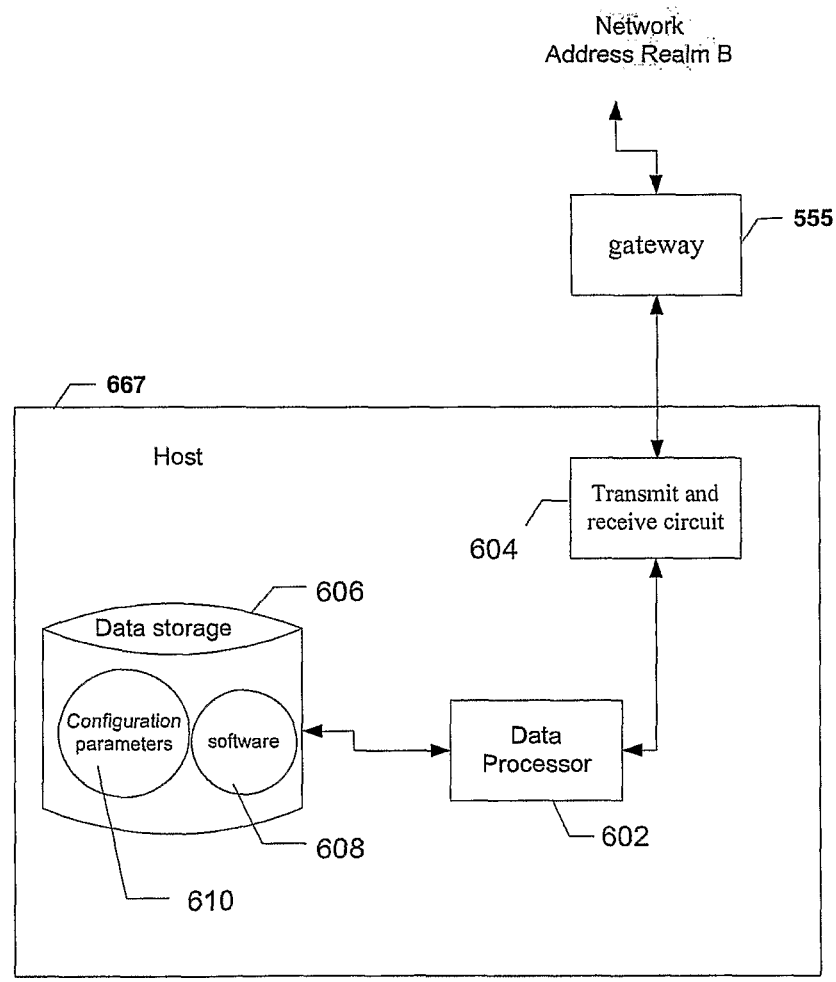
FIG. 6. is a functional block diagram of a client host according to some embodiments of the invention.

Referring now to FIG. 6, FIG. 6 is a functional block diagram of host 667 according to some embodiments of the invention. As shown, host 667 may comprise a data processing system 602 (e.g., one or more microprocessors), a data storage system 606 (e.g., one or more non-volatile storage devices) and computer software 608 stored on the storage system 606. Configuration parameters 610 may also be stored in storage system 606. Host 667 also includes transmit/receive (Tx/Rx) circuitry 604 for transmitting data to and receiving data from gateway 555. Software 608 is configured such that when processor 602 executes software 608, host 667 performs steps described above (e.g. steps described above with reference to the flow chart shown in FIG. 4). For example, software 608 may include: (1) computer instructions for using the transmitter 604 to transmit to gateway server 205a a request for a network resource from addressing realm B; (2) computer instructions for receiving from the gateway server a message comprising a network resource from addressing realm B; (3) computer instructions for using the received network resource to communicate with client 220; and (4) computer instructions for using the transmitter 604 to transmit to backup gateway server 205b the network resource received from gateway server 205a in response to receiving an indication that gateway server 205a is not functioning.

While various embodiments of the present invention have been described above, it should be understood that they have been presented by way of example only, and not limitation. Thus, the breadth and scope of the present invention should not be limited by any of the above-described exemplary embodiments.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:

1. A method performed by a first client executing on a first host from a first addressing realm for communicating with a remote client executing on a remote host from a second addressing realm, comprising:
   transmitting to a first gateway server a request for a network resource from the second addressing realm;
   receiving from the first gateway server a message comprising a network resource from the second addressing realm;
   using the received network resource to communicate with the remote client;
   receiving an indication that the first gateway server is not functioning;
   in response to receiving the indication, transmitting to a second gateway server the network resource received from the first gateway server;
   after transmitting the network resource to the second gateway server, receiving from the second gateway server a message indicating that the first client should not continue using the network resource; and
   after receiving the message, restarting the first client or rebooting the first host.

2. The method of claim 1, wherein the first client transmits the network resource to the second gateway server in response to receiving the indication only if the network resource is still allocated to the first client at the time the first client receives the indication.

3. The method of claim 1, wherein, in response to receiving the indication, the first client transmits to the second gateway server all currently held network resources that were allocated to the first client by the first gateway server.

4. The method of claim 1, wherein the network resource comprises a set of one or more network addresses from the second addressing realm.

5. The method of claim 4, wherein the network addresses are Internet Protocol (IP) addresses.

6. The method of claim 1, wherein the network resource further comprises a set of one or more port numbers.

7. The method of claim 1, wherein the second gateway server is executing on a second host that is separate and distinct from the first host.

8. The method of claim 1, wherein the network resource comprises a network address and the step of using the network resource to communicate with the remote client comprises:
   generating a packet comprising (i) a first header, (ii) a second header and (iii) a payload, wherein the first header includes a source address field that is set to the network address from the second addressing realm, the second header includes a source address field that is set to an address that was allocated to the first host; and
   transmitting the packet to the first gateway server, wherein the first gateway server is configured to send the packet without the second header to the remote client.

9. A method performed by a first client executing on a first host from a first addressing realm for communicating with a remote client executing on a remote host from a second addressing realm, comprising:
   transmitting to a first gateway server a request for a network resource from the second addressing realm;
   receiving from the first gateway server a message comprising a network resource from the second addressing realm;
   using the received network resource to communicate with the remote client;
   receiving an indication that the first gateway server is not functioning; and
   in response to receiving the indication, transmitting to a second gateway server the network resource received from the first gateway server, wherein the second gateway server is configured to set a delayed allocation (DA) timer to expire after a predetermined amount of time after receiving from the first client the network resource.

10. A method for recovering from the failure of a gateway server belonging to a first addressing realm and a second addressing realm, comprising:
   (a) receiving, at a backup gateway server belonging to the first addressing realm and the second addressing realm, a message transmitted from a client, the message comprising a network resource from the second addressing realm previously allocated to the client by the gateway server that failed;
   (b) after step (a), determining whether the network resource is free, wherein the determination is made by the backup gateway server; and
   (c) allocating the network resource to the client in response to determining that the network resource is free.

11. The method of claim 10, further comprising setting a delayed allocation (DA) timer to expire after a predetermined amount of time after performing step (a).

12. The method of claim 11, wherein the DA timer is set only if it is determined in step (b) that the network resource is free.

13. The method of claim 11, further comprising:
receiving, at the backup gateway server, a request transmitted from a second client for a second network resource from the second addressing realm;
rejecting the request if the DA timer has not expired; and
transmitting, from the backup gateway server, to the second client a second network resource from the second addressing realm if the DA timer has expired and the second network resource is available to be allocated to the second client.

14. The method of claim 13, wherein the step of rejecting the request comprises not transmitting to the second client any response to the request.

15. The method of claim 13, wherein the step of rejecting the request comprises transmitting to the second client a response to the request indicating that the request is denied.

16. The method of claim 10, further comprising causing the client to relinquish the network resource from the second addressing realm in response to a determination that the network resource is not free.

17. The method of claim 10, further comprising causing the client to relinquish the network resource from the second addressing realm in response to a determination that (a) the network resource is currently allocated to another client and (b) the another client is not executing on the same host as the backup gateway server.

18. The method of claim 16, wherein the step of causing the client to relinquish the network resource comprises restarting the client or rebooting the host on which the client is executing.

19. The method of claim 10, wherein the network resource comprises a set of one or more network addresses, and the step of determining whether the network resource is free comprises determining whether a network address included in the set of network addresses is currently allocated to another client.

20. The method of claim 19, further comprising:
determining whether the another client is executing on the same host as the backup gateway server in response to determining that a network address included in the set of network addresses is currently allocated to the another client; and
causing the another client to relinquish the network address if it is determined that the another client is executing on the same host as the backup gateway server.

21. The method of claim 20, further comprising allocating the network address to the first client after causing the another client to relinquish the network address.

22. The method of claim 10, further comprising:
prior to performing step (a), detecting the failure of the gateway server;
in response to detecting the failure of the gateway server, determining a set of clients that should receive a notification indicating the failure of the gateway server; and
transmitting, to each client in the determined set of clients, a message indicating that the gateway server has failed.

23. The method of claim 22, wherein the step of determining the set of clients that should receive the notification comprises determining all of the clients that are connected to a gateway server monitor.

24. The method of claim 10, wherein the network resource comprises a set of one or more network address from the second addressing realm.

25. The method of claim 24, wherein the network resource further comprises a set of one or more port numbers.

26. A client host apparatus belonging to a first addressing realm, the client host apparatus comprising:
a transmitter;
data storage system that stores computer software; and
a data processing system for executing the computer software, wherein the computer software comprises:
computer instructions for using the transmitter to transmit to a first gateway server a request for a network resource from a second addressing realm;
computer instructions for receiving from the first gateway server a message comprising a network resource from the second addressing realm;
computer instructions for using the received network resource to communicate with a remote client; and
computer instructions for using the transmitter to transmit to a second gateway server the network resource received from the first gateway server in response to receiving an indication that the first gateway server is not functioning, wherein
the computer software further comprise:
computer instructions for receiving from the second gateway server a message indicating that a client executing on the client host apparatus should not continue using the network resource; and
computer instructions for restarting the first client or rebooting the first host in response to receiving the message.

27. The client host apparatus of claim 26, wherein the network resource comprises a set of one or more network addresses from the second addressing realm.

28. The client host apparatus of claim 27, wherein the network resource further comprises a set of one or more port numbers.

29. The client host apparatus of claim 26, wherein the network resource comprises a network address and the computer instructions for using the network resource to communicate with the remote client comprises:
computer instructions for generating a packet comprising (i) a first header, (ii) a second header and (iii) a payload, wherein the first header includes a source address field that is set to the network address from the second addressing realm, the second header includes a source address field that is set to an address that was allocated to the first host; and
computer instructions for transmitting the packet to the first gateway server.

30. A gateway server apparatus belonging to a first addressing realm and a second addressing realm, comprising:
a transmitter;
a receiver;
data storage system that stores computer software; and
a data processing system for executing the computer software, wherein the computer software comprises:
(a) computer instructions for receiving a message transmitted from a client belonging to the first addressing realm, the message comprising a network resource from the second addressing realm previously allocated to the client by a gateway server that has failed;
(b) computer instructions for determining whether the network resource is free in response to receiving the message; and (c) computer instructions for allocating the network resource to the client in response to determining that the network resource is free.

31. The gateway server apparatus of claim 30, wherein the computer software further comprises computer instructions for setting a delayed allocation (DA) timer to expire after a predetermined amount after receiving the message.

32. The gateway server apparatus of claim 31, wherein the DA time is set only if it is determined that the network resource is free.

33. The gateway server apparatus of claim 31, wherein the computer software further comprises:
   computer instructions for receiving a request transmitted from a second client for a second network resource from the second addressing realm;
   computer instructions for determining whether the DA timer has expired in response to receiving the request; and
   computer instructions for transmitting to the second client a second network resource from the second addressing realm in response to a determination that the DA timer has expired and the second network resource is available to be allocated to the second client.

34. The gateway server apparatus of claim 30, wherein the computer software further comprises computer instructions for causing the client to relinquish the network resource from the second addressing realm in response to a determination that the network resource is not free.

35. The gateway server apparatus of claim 30, wherein the computer software further comprises computer instructions for causing the client to relinquish the network resource from the second addressing realm in response to a determination that (a) the network resource is currently allocated to another client and (b) the another client is not executing on the gateway server apparatus.

36. The gateway server apparatus of claim 30, wherein the network resource comprises a set of one or more network addresses, and the computer instructions for determining whether the network resource is free comprises computer instructions for determining whether a network address included in the set of network addresses is currently allocated to another client.

37. The gateway server apparatus of claim 36, wherein the computer software further comprises:
   computer instructions for determining whether the another client is executing on the gateway server apparatus in response to determining that a network address included in the set of network addresses is currently allocated to the another client; and
   computer instructions for causing the another client to relinquish the network address if it is determined that the another client is executing on the gateway server apparatus.

* * * * *

UNITED STATES PATENT AND TRADEMARK OFFICE
CERTIFICATE OF CORRECTION

Page 1 of 1

PATENT NO. : 8,812,894 B2
APPLICATION NO. : 13/144602
DATED : August 19, 2014
INVENTOR(S) : Hammam et al.

It is certified that error appears in the above-identified patent and that said Letters Patent is hereby corrected as shown below:

On the Title Page, Item (75), under "Inventors", in Column 1, Line 2, delete "Trangsund" and insert -- Trångsund --, therefor.

On the Title Page, Item (75), under "Inventors", in Column 1, Line 2, delete "Mattias" and insert -- Matthias --, therefor.

In the specification

In Column 5, Line 52, delete "FIG. 5." and insert -- FIG. 5 --, therefor.

In Column 5, Line 54, delete "FIG. 6." and insert -- FIG. 6 --, therefor.

Signed and Sealed this
Thirteenth Day of October, 2015

Michelle K. Lee
*Director of the United States Patent and Trademark Office*